United States Patent

[11] 3,589,699

| [72] | Inventor | William F. Bogan |
| | | Bethel Park Boro, Pa. |
| [21] | Appl. No. | 847,376 |
| [22] | Filed | Aug. 4, 1969 |
| [45] | Patented | June 29, 1971 |
| [73] | Assignee | Dravo Corporation |
| | | Pittsburgh, Pa. |

[54] DISCHARGE TAP FOR MELTING FURNACES
15 Claims, 3 Drawing Figs.

[52] U.S. Cl. ..................................... 266/42,
266/37, 266/38
[51] Int. Cl. .................................................. C21b 7/12
[50] Field of Search ........................................ 266/23, 34,
37, 38, 42; 13/33

[56] References Cited
UNITED STATES PATENTS
| 2,585,394 | 2/1952 | MacDonald | 266/42 X |
| 2,821,378 | 1/1958 | Tama | 266/38 X |
| 3,088,182 | 5/1963 | Tama et al. | 266/38 X |

Primary Examiner—Gerald A. Dost
Attorney—Parmelee, Otzler & Welsh

ABSTRACT: There is disclosed a discharge tap for melting furnaces, especially applicable, but not necessarily limited, to a slag discharge tap for cupolas. A refractory tubelike element is supported in an upwardly and outwardly inclined position on the furnace with its lower end below the normal liquid level in the furnace and its outer end at a preestablished overflow level. The tube is a good heat-conducting material, whereby heat is rapidly conducted to its exposed outer end, and is also an electrical conductor so that it may function as a resistance heater to a heating current supplied thereto in such manner that most of its length is traversed by the current.

INVENTOR.
William F. Bogan.

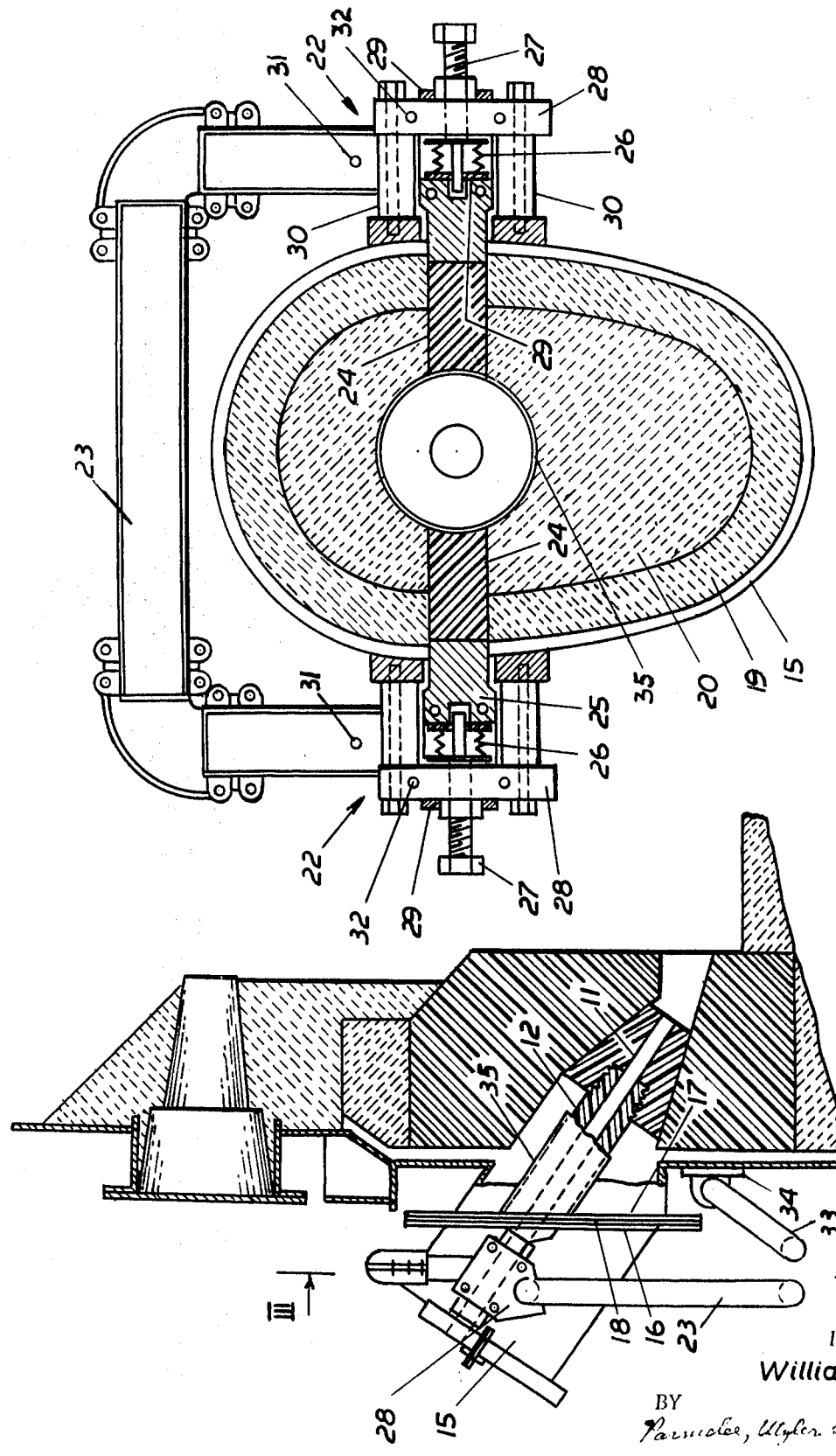

DISCHARGE TAP FOR MELTING FURNACES

This invention is for a tap for the discharge of molten material from a melting furnace.

While the present invention is applicable to melting furnaces of various types, it has particular utility with cupola-type melting furnaces where both molten metal and molten slag result from the operation of the furnace, and the invention will therefore be specifically described in connection with such furnaces. Without exclusion, however, of furnaces of other types.

Modern cupola furnaces used in the melting of iron or steel are commonly operated with an internal pressure higher than atmospheric pressure. Both molten metal and molten slag are produced in the operation of the furnace with the slag, being lighter, floating on the metal. A common practice has been to continuously withdraw molten slag and molten metal from a tap hole near the base of the furnace, but there are certain objections, one being that a tap hole lining resistant to molten metal is rapidly eroded by molten slag, and refractory resistant to molten slag is rapidly destroyed by molten metal, and relining necessitates a shutdown. Usually, therefore, a compromise material has been used, having optimum properties for neither slag nor metal, and which still requires too frequent relining of the tap hole. A second drawback is that separation of slag and metal must be made outside the furnace and before solidification of the molten metal takes place.

These difficulties, and others, have led to the use of separate tap holes for the molten metal and the slag at different levels. While a weir arrangement is used for the continuous withdrawal of metal while maintaining a substantially uniform depth of metal and slag in the furnace, the slag removal causes difficulty because it congeals at higher temperature than the metal, and being produced at a lower rate, flows more slowly. When removed separately from the metal, it no longer has the outflowing body of molten metal on which to float to sustain its temperature and be carried out with the metal. Since there is a pressure to be maintained in the furnace, the slag discharge port is so restricted and located that the tap hole or port will never be open to atmosphere during normal operation. This has presented a difficult problem of keeping the slag from freezing in the slag discharge port and still having the required restricted flow.

Attempts have been made to correct this condition with external gas burners and with electric resistor elements around the refractory outlet, but there are drawbacks to both of these. This is especially so with electric resistors because of the inefficient heat transfer where adequate protection for the resistors is provided.

The present invention utilizes a refractory tube in the furnace wall having a high coefficient of thermal conductivity with its inner end in a region of high temperature so that the discharge end of the tube is kept heated by the rapid conduction of heat thereto. Desirably also, the tube is a conductor of electricity capable of providing a resistance heater when an adequate electric current traverses most of its exposed length. Electric heating can be used in start-up and when needed to supplement the conducted heat during operation to maintain the desired condition of fluidity in the slag. Such a tube may be formed of carbon, such as the bonded carbon used in electric furnace electrodes.

It will therefore be seen that the invention enables a tap hole to be provided for a desired flow rate and eliminate freezeups. Applied to a cupola the slag can be removed separately from the metal at the required rate, and pressure conditions can be maintained as required inside the furnace.

A primary object of the invention is to provide a novel tap for the discharge of molten material from a melting furnace and particularly a novel slag tap for a cupola having a separate metal tap.

In the drawings

FIG. 2 is a fragmentary vertical sectional view on a larger scale showing the tap of the present invention, parts being shown in elevation; and FIG. 3 is a horizontal sectional view in the plane of line III-III of FIG. 2.

Figure 1:
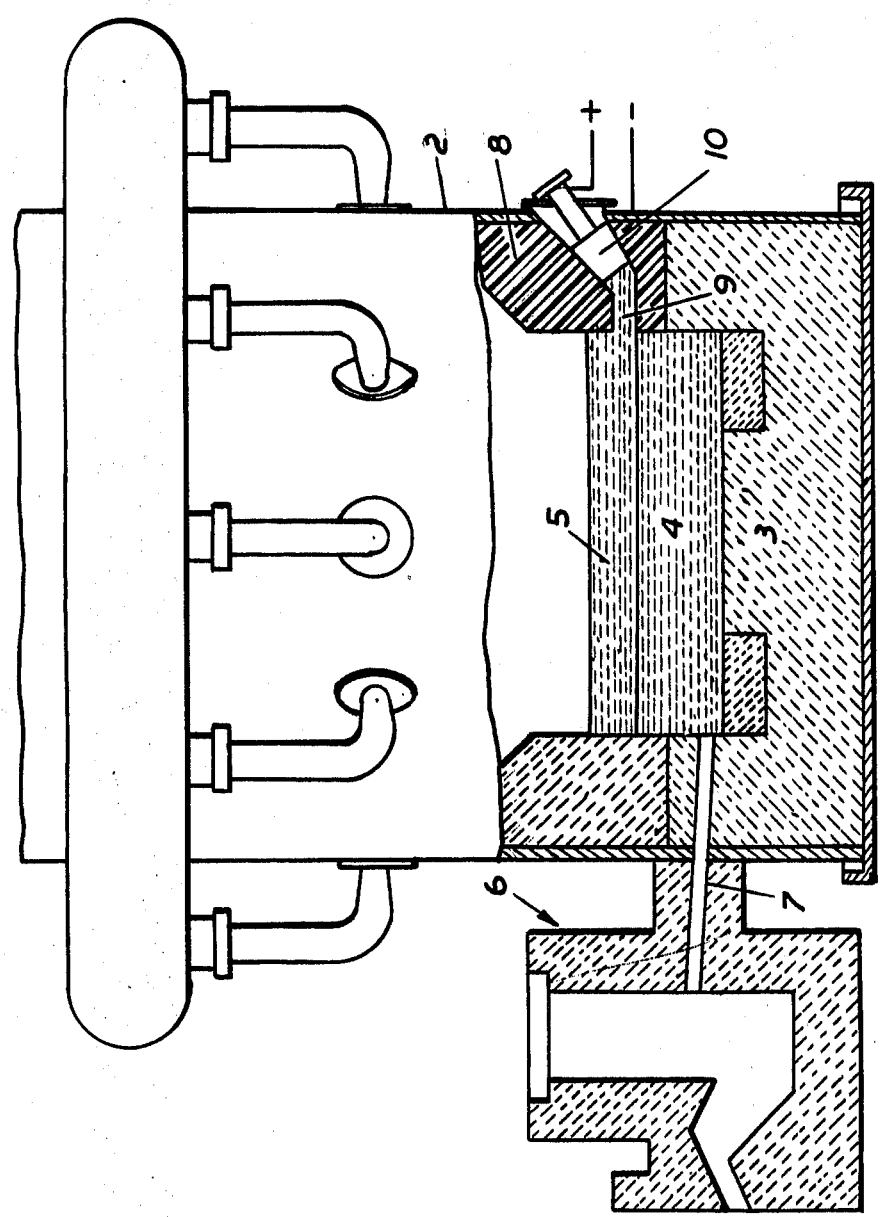
FIG. 1 is a view, partly in section and partly in elevation showing the lower portion of a cupola furnace embodying my invention.

Since the invention has particular application to the slag tap of a cupola furnace having separate discharge provisions for molten metal and molten slag, a cupola has been shown as the preferred embodiment without exclusion of other furnaces where a molten material is discharged while the tap or outlet must be protected from the outflowing material solidifying and cooling.

In the drawings, 2 designates generally a cupola furnace of any known or preferred construction with a hearth area 3 on which molten metal, indicated at 4, and an overlying pool 5 of molten slag is retained. Molten metal is continuously withdrawn through a refractory structure 6 through a restricted passageway 7 at a rate to retain the pool of molten metal in the furnace. This structure 6, is of a known form and provides a type of weir or trap from which any entrained slag may be removed. The refractory at the bottom portion is selected in this instance to best withstand contact with and the wash of molten iron.

Above the hearth and the molten metal tap there is a refractory ring 8 that is usually made of a dense carbon which is resistant to slag. Near the base of this ring there is a slag tap opening 9, the outer portion of which slopes upwardly and is of outwardly increasing diameter. A tapered plug 10 is wedged into this opening, with its inner end close to but out of contact with the molten metal under normal operating conditions, but below the level of the top of the overlying pool of slag. As previously stated, it is made of a refractory that is a good conductor of heat, and which is also a conductor of electricity. Preferably it has a dense structure and is formed of one of the several grades of carbon base materials, typically the same as the carbon of electric furnace electrodes. National Carbon Company grades GA, S and D are such materials. There is an axially extending opening 11 through the plug and the outer end is countersunk to receive the inner end of a tubelike extension 12 that is of the same carbon composition and its internal diameter is the same as the diameter of the opening 11. As indicated in FIG. 2, the inner end of the tube may be threaded into the plug to make a firm and intimate connection therewith. The plug and tube both have a coefficient of thermal conductivity higher than that of the slag so as to conduct heat from its inner end toward its exposed outer end at a rate per unit of length faster than the slag. Therefore, with a reasonable wall thickness it may supply heat to the slag, or at least minimize absorption of heat from the slag that flows through it. To state it another way, the temperature gradient from the inner end of the tube to the outer end would drop off less sharply along the tube than would be the case with the insulating refractories customarily used for furnace discharge tap passages.

The plug and tube comprise together an upwardly and outwardly inclined slag tap. The outer discharge end of the tap is above the level of the slag 5 in the furnace during operation of the furnace because the internal pressure in the furnace tends to hold the level of the slag in the furnace down and force the slag to flow up and out the discharge end of the spout or tube. The passage through the plug and tube are selected to permit a continuous but restricted flow of slag therethrough at a rate comparable to the rate of slag formation. To keep the outer end of the carbon tube from contact with the outflowing air exposed slag there is a refractory plate 13 over the outer end of the tube over which the emerging slag flows, and from which it drips.

With a cupola in operation the carbon plug at the end of the carbon tube is below the level of the plug at all times, which is important both in preventing the escape of furnace gases and also for conduction of heat to the outer end of the tube so that the temperature at the outer end will have little or no chilling effect on the slag, particularly when it is surrounded by insulation as hereinafter described.

However, in cases where the slag solidifies at a relatively high temperature, and where the slag discharge tube is quite restricted, added heat may be necessary, and in such case the electrically conductive slag tap may comprise a resistance heater. For this purpose, and for insulating the tube 12, both against loss of heat, there is provided around the tube and in spaced relation thereto a metal shield 15 with a flange 16 at its inner end secured to a flanged extension 17 on the metal exterior of the furnace with insulation 18 effectively disposed between the confronting flanges to insulate the shield electrically from the body of the furnace. This shield is preferably lined with a layer of refractory 19 of a high temperature-resistant nonconducting refractory (see FIG. 3). Between this lining and the exterior of the tube 12 there is a thick body of rammed heat and electric insulating refractory 20 that fills the space around the tube from the outer end of the plug 11 to the outer end of the shield so that it is coextensive with the length of the tube beyond the plug.

Provision is made for connecting the outer end of the tube with one terminal of a low-voltage high-amperage current source. As here shown, two electrical connectors 22 joined by a common conductor 23 are fastened to opposing sides of the shield or shell 15. There are contact shoes 24 formed of graphite bearing against and extending radially outward from opposite sides of the outer end portion of the tube 12. The outer ends of these shoes bear against the inner ends of metal contact plates 25. These plates are urged by their respective Belleville spring assemblies 26 against the shoes, the spring assemblies each being confined against a pressure-adjusting screw 27 on a plate 28. There is a U-shaped conductor 29 having one end brazed to the outer surface of the contact plate and its other end brazed to plate 28 to provide a yieldable conductor from plate 28 to the follower contact plates 25. The plate 28 is secured to the shield with intervening spacers 30 by four bolts that pass through the plate, the spacers and their inner ends are screwed into tapered holes in the shield. The ends of the common conductor 23 are welded to the respective plates 28. Water cooling of the connectors may be desirable, and for this purpose water inlet and outlet ports are indicated at 31 for circulation of water through conductors 23 which is hollow, and other water inlet and outlet ports are indicated at 32 in the plates 28. The Belleville springs exert a yielding pressure that allows for relative expansion and contraction of the assembly.

The other terminal of the current source comprises conductor 33 grounded at 34 on the outside of the metal shell close to the discharge tube assembly, the current path in this case being between conductor 33, the carbon refractory block 8, the plug 10, tube 12 and connectors 22 and conductor 23. A current of approximately 7,700 amperes at around 30 volts or less is satisfactory and offers no danger to personnel. The insulating gasket 18 in the flanged connection 16—17 prevents short-circuiting from the shell of the furnace to the shield. This assures that the plug 10 and the length of tube 12 comprise the resistance path.

For purposes of economy both the plug 10 and the tube 12 are preferably off-the-shelf commercial items now available for other purposes. The rammed refractory body 20, in addition to providing insulation, forms a seal against the escape of furnace gases and holds the plug firmly in place. Since it will normally contain moisture when it is rammed into place, which may then yield oxygen when the moisture is driven off, it is desirable to provide a temporary moisture barrier 35 around the carbon tube that will withstand high temperatures for a short time. This may be accomplished by wrapping the tube with a protective material, such as "Scotch" brand 9040 high temperature aluminum tape. Also, if the molten material reacts with carbon, which is not normally the case with cupola slag, the carbon tube may have a ceramic lining through the interior passage, and the hole through the plug may be similarly lined.

With the present invention, even a small outlet passage through the plug and tube assembly may be kept above the solidification temperature of the molten material, either by conducted heat alone, or by conducted heat with the added heat generated in the tap assembly by its functioning as an electric resistance element.

Rebuilding of the slag tap after a period of usage may be accomplished after removing only the pool of slag in the cupola, and the rebuilding is relatively simple. The connectors 22 are completely removed and the shield or shell 15 is unbolted at the flange 16—17. The various refractory pieces are chipped out or pulled away. Buildup starts by fitting a preassembled new plug and tube assembly into the hole 9. The new tube is wrapped with the vapor barrier material 35. Refractory is then rammed into the cavity around the tube 12 to the flange 16. At this point the shell 15 with a new liner 19 and a new gasket 18 is bolted into place and the remaining cavity is filled with refractory, removable blocks being set in the refractory to provide cavities for the contact shoes 24 which are subsequently inserted and the connectors applied. The refractory shield 13 is then built up or otherwise applied.

In the operation of a typical hot blast metallurgical cupola made with my improvement as seen in FIG. 1, there is a hot iron pool which is continuously tapped without slag through the usual tapping arrangement as above described. This hot metal tap is lined with a refractory material chosen to accommodate hot iron alone without regard to its compatibility with slag. However, preferably a receiver-separator arrangement 6 is provided to separate iron from slag in the event that slag should in some case be tapped along with the iron—whether inadvertently or temporarily as in case of a slag tap failure. Above the hot iron pool a slag layer 5 is floated and slag from this pool is tapped continuously through the present invention. The length of the slag tap hole is typically of the order of about 6 feet, extending through the furnace structure and reaching high enough to maintain the slag bed depth and to offset the internal blast pressure. The initial diameter of this hole is only about 3 inches. Due to the heating provided by the present invention, slag freezeup will not occur even though a slow flow rate is maintained through the rather long and small tap hole. Typically, with about 50 tons per hour of iron being produced, slag will form and flow at a much slower rate of about 7 tons per hour. Continual operation without manual aid can be expected of the separate tapping devices and each will have a marked increase in life over the customary combined tapping device.

I claim:

1. For use in a furnace having a bottom and sidewall structure designed to retain a pool of molten liquid, the invention comprising:
   a. a discharge outlet element for the molten liquid set into the furnace structure and projecting beyond the furnace structure, said outlet element having at least one passageway therethrough with the inner end of the passageway opening into the furnace,
   b. said element being comprised of an electrically conductive resistance material, and
   c. means for connecting opposite end portions with a source of heating current.

2. The invention defined in claim 1 in which said element is comprised entirely of a refractory material.

3. The invention defined in claim 2 in which said elements is comprised principally of bonded carbon.

4. The invention defined in claim 1 in which the element is comprised principally of carbon with an electric insulating refractory surrounding the element except at its inner end, and a refractory plate at the outer end of the element arranged to protect the element from air-exposed slag.

5. For use with a melting furnace having a refractory lining with a tap hole therethrough, the invention comprising:
   a. a tubular discharge tube of a heat-conducting refractory material sealed in said opening and extending upwardly and outwardly from the furnace wall whereby the inner end of the tube is continuously immersed during the operation of the furnace by a pool by molten material in the furnace to be discharged through said tube and molten material flows out said tube from below the surface of the pool, b. the tube having a higher coefficient of thermal conductivity than the molten material whereby it is hotter at the discharge end than the molten material that is discharged from said pool through the tube.

6. The invention defined in claim 5 wherein the upwardly and outwardly extending end portion of said tube is surrounded by thermal insulation to retard loss of heat from the exterior thereof.

7. The invention defined in claim 6 wherein the tube is tightly joined at its inner end to a plug of larger diameter than the tube of a similar composition, the plug being tightly fitted into the tap hole and having an axially extending opening therethrough in register with the hollow interior of the tube.

8. The invention defined in claim 7 wherein the tube and plug are comprised principally of carbon.

9. For use with a melting furnace having a refractory wall area with a tap hole for the discharge of molten material therefrom, the invention which comprises:
a. having the outer end of said hole of a truncated conical shape of outwardly increasing diameter and with its axis inclined upwardly and outwardly,
b. a plug of truncated shape fitted in said outer end of the opening, the plug having an axially extending passageway therethrough,
c. a straight tube of smaller diameter than the plug attached to the plug with the passage therethrough aligned with the opening in the plug, the tube extending upwardly and outwardly beyond the exterior of the furnace,
d. the plug and tube both being comprised of carbon, and
e. a body of heat-insulating refractory filling said opening in the furnace wall from the outer end of the plug and extending from the plug to the outer end of the tube.

10. For use with a melting furnace having a refractory wall with an opening therethrough for the discharge of molten material therefrom, the invention comprising:
a. a molten metal discharge tube assembly sealed in said opening and extending upwardly and outwardly therefrom with its upper end terminating at a level above the said hold and with its outer portion projecting beyond the furnace wall,
b. the said tube assembly being comprised of a heat-conducting refractory that is also an electrical conductor, and
c. means for connecting the opposite end portions of said assembly to a source of current whereby heat is generated in said assembly as well as being conducted from its lower inner end portion to its outer terminal portion.

11. In a cupola-type furnace having a lower end portion provided with a molten iron discharge tap arranged to maintain a pool of molten metal at a predetermined level in the bottom of the furnace and having a slag discharge port through the wall opening into the furnace at about the top of the normal level of the molten iron in said pool, the invention comprising:
a. an outwardly and upwardly extending slag discharge assembly with a continuous passage therethrough having a plug at one end sealed into the slag discharge port at a level close to but clear of the normal molten metal level, the opposite end portion of said tube projecting outwardly from the furnace wall with its terminal at a level sufficiently above said level to assure that the plug end of the tube will be below the surface of a pool of molten slag that collects on the molten metal while the furnace is in operation,
b. said tube being comprised of carbon and having a coefficient of thermal conductivity higher that that of the molten slag.

12. The invention of claim 11 in which said tube, except for the plug, is enclosed in an electric insulating heat refractory.

13. The invention of claim 12 in which there is a metal shield attached to the furnace surrounding the projecting portion of said tube, the shield being spaced from the tube and the refractory filling the space between the tube and the shield.

14. The invention of claim 13 characterized by the provision of means for applying an electric current to opposite ends of the discharge tube assembly capable of heating the same by the flow of current therethrough.

15. The invention defined in claim 14 wherein there is an electric connector at the outer end portion of the tube assembly and the furnace wall with the opening in which the plug is sealed being also of a carbon material, a current conductor from one said of a low voltage high amperage current source being connected to said connector and a current conductor from the other side of said current source grounded in the carbon furnace wall in proximity to the plug end of said slag discharge tube assembly.